US007849469B1

(12) United States Patent  (10) Patent No.: US 7,849,469 B1
Michel et al.  (45) Date of Patent: Dec. 7, 2010

(54) METHODS AND APPARATUS PROVIDING A CATEGORICAL APPROACH TO ASPECT-ORIENTED PROGRAMMING

(75) Inventors: Ruben Michel, Hopkinton, MA (US); Stanislav Sosnovsky, Upton, MA (US); Richard Francis Cormier, Franklin, MA (US); Vitaly Rozenman, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1123 days.

(21) Appl. No.: 11/325,286

(22) Filed: Jan. 4, 2006

(51) Int. Cl.
G06F 3/00 (2006.01)
G06F 9/44 (2006.01)
(52) U.S. Cl. .................. 719/316; 719/315; 719/328; 719/330; 717/100
(58) Field of Classification Search .............. 707/103, 707/104; 717/114, 137; 719/315–328
See application file for complete search history.

(56) References Cited

U.S. PATENT DOCUMENTS 7,444,536 B1 * 10/2008 Jairath ........................ 714/4
2003/0145094 A1 * 7/2003 Staamann et al. ........... 709/229
2003/0221126 A1 * 11/2003 Berman et al. .............. 713/201
2004/0015898 A1 * 1/2004 Tewksbary ................. 717/140
2005/0022208 A1 * 1/2005 Bolar et al. ................ 719/315

* cited by examiner

*Primary Examiner*—Andy Ho
*Assistant Examiner*—Shih-Wei Kraft
(74) *Attorney, Agent, or Firm*—Chapin IP Law, LLC

(57) ABSTRACT

A system uses generative aspect oriented programming to propagating context between components in a component server, the system produces code that, when executed, implicitly propagates authenticating context between a client component and an invoked component which the client component invokes in a component server. The system generates a function that allows the specification of a timeout between the client component and the invoked component that the client component invokes in the component server. The timeout function receives a user-defined timeout value to be applied for interface invocations between the client component and the invoked component. The system further generates a function declaration that, upon execution, discloses a target component identity between a client component and an invoked component that the client component invokes in the component server. The target component identity specifies a specific identity of a target computer system to which an interface invocation between the client component and the invoked component is directed.

19 Claims, 4 Drawing Sheets

METHODS AND APPARATUS PROVIDING A CATEGORICAL APPROACH TO ASPECT-ORIENTED PROGRAMMING

BACKGROUND

Computer software applications are often distributed between computer systems and require ability to access and exchange information with other remotely operating software applications. Such exchanges of data and access to functionality often take place over a computer network such as a local area network or a wide area network such as the Internet. Due to the complexities and varying mechanisms of implementing functionality and data formats within modern software applications, software developers often employ software commonly referred to as "middleware" that provides a standardized mechanism for the exchange of information and access to functionality between two or more remotely operating software programs. Middleware is generally connectivity software that consists of a set of enabling services that allow multiple processes running on one or more machines to interact across a network.

Middleware allows a software developer to create a software application using calls to a middleware-specific application programming interface or API in order to insulate the software developer from having to know the details of how to access the remotely operating software application and associated remote data structures or objects. By incorporating a set of middleware-specific function calls into the application under development, the software developer relies on the middleware transport and data access mechanisms and does not need to be concerned with details such as creation of connections to remote computer systems. Middleware is thus software that connects otherwise separate applications or separate products and serves as the glue between the applications. Middleware is thus distinct from import and export features that may be built into one of the applications. Developers often refer to middleware "plumbing" because it connects two sides of an application and passes data between them. For example, there are a number of middleware products that link a database system to a web server. This allows a user application to request data from the database using forms displayed on a web browser, and it enables the web server to return dynamic web pages based on the user application's requests.

One example of commonly used middleware architecture is called CORBA. CORBA is an acronym for Common Object Request Broker Architecture. The CORBA environment is an industry standard that is maintain by Object Management Group, Inc. (OMG) of Needham, Mass., USA. As described on OMG's web site, CORBA provides a vendor-independent architecture and infrastructure that computer applications use to work together over data networks. Using standardized protocols, a CORBA-based program from any vendor, on almost any computer, operating system, programming language, and network, can interoperate with a CORBA-based program from the same or another vendor, on almost any other computer, operating system, programming language, and network.

Conventional CORBA applications are composed of objects that are individual units of running software that combine functionality and data. Typically, there are many instances of an object of a single type. For example, an e-commerce website would have many shopping cart object instances, all identical in functionality but differing in that each is assigned to a different customer (i.e., client browser), and each contains data representing the merchandise that its particular customer has selected. For other object types, there may be only one instance. As an example, when a legacy application, such as an accounting system, is wrapped in code with CORBA interfaces and opened up to clients on a network, there is usually only one instance.

For each object type, such as the shopping cart mentioned above, a developer using middleware such as CORBA defines an interface in an OMG Interface Description Language (IDL). The interface is a syntax part of a contract that a server object offers to client programs that invoke functionality and access data within that server object. Any client that wants to invoke an operation on the object must use this IDL interface specification (i.e., object specification) to specify the operation it wants to perform, and to marshal arguments (i.e., parameters or data) that the client sends and receives from the server for access to that object. When the invocation reaches the target object, the same interface definition is used there to unmarshal the arguments so that the object can perform the requested data processing operation with the arguments. The interface definition is then used to marshal the results for their trip back to the client, and to unmarshal them when they reach the client destination.

A conventional IDL interface definition is independent of a selected programming language, but maps to all of the popular programming languages via industry standards. As an example, there are standardized mappings from IDL to C, C++, Java, COBOL and other languages.

The use of a middleware-specific interface, such as a CORBA call, that is separate from the middleware implementation, enabled by the IDL, is one essence of middleware such as CORBA and explains how conventional middleware enables interoperability between applications with all of the above noted transparencies. The interface to each object using a conventional middleware platform is defined very strictly. However, CORBA and other middleware platforms hide the implementation of an object (i.e., its running code and its data) from the rest of the system (that is, middleware encapsulates the implementation) behind a boundary that the client application may not cross. Clients access objects only through their advertised CORBA (or other middleware-specific) interface, invoking only those CORBA (or other middleware) operations that the object exposes through its IDL interface, with only those CORBA (or other middleware) parameters (input and output) that are included in the invocation.

FIG. 1 is a prior art illustration of an invocation 90 by a single client process 80 for access to an object implementation 82 using middleware such as CORBA including an IDL stub 84, an object request broker 86, and an IDL skeleton 88. While the instant example uses CORBA as the middleware platform, the example applies to other conventional middleware platforms as well.

Prior to execution, a developer 70 using an IDL compiler 72 compiles an object model specification 74 defined in IDL into client IDL stubs 84 and object skeletons 88, and writes the code for the client 80 and for the object implementation 82. The stubs 84 and skeletons 88 serve as proxies for clients 80 and object 82 (e.g., server), respectively. Because IDL defines interfaces so strictly, the stub 84 on the client side has no trouble meshing perfectly with the skeleton 88 on the server side, even if the two are compiled into different programming languages. If CORBA is the middleware that provides the object request broker (ORB) 86, the CORBA ORB 86 can even be produced from different vendors so long as it conforms to the CORBA standard.

In CORBA, every object instance 82 has its own object reference in the form of an identifying electronic token or string. Clients 80 use the object references to direct their invocations 90, identifying to the ORB 86 the exact instance of an object 82 that the client 80 wants to invoke. Using the shopping cart example, this ensures that the shopping cart object 82 for one client 80 is different from a shopping cart object of another client. The client 80 acts as if it is invoking an operation on the object instance 82, but the client 80 is actually invoking a call on the IDL stub 84 that acts as a proxy to the object 82. Passing through the stub 84 on the client side, the invocation 90 continues through the ORB 86, and the skeleton 88 on the implementation side, to get to the object implementation 82 where it is executed. FIG. 1 thus shows invocation through a single machine.

FIG. 2 diagrams a remote invocation 92 that occurs over a network 94. In order to invoke the remote object instance, the client 80 first obtains its object reference using a naming or trading service. To make the remote invocation 92, the client 80 uses the same code used in the local invocation described in FIG. 1, but substitutes the object reference for the remote object instance. When the local ORB 86 examines the object reference and discovers that the target object is a remote object, the local ORB 86 routes the invocation 92 out over a network 94 to the remote object's ORB 96.

To identify the object, the client 80 knows the type of object that it is invoking (e.g., that it's a shopping cart object), and the client stub 84 and object skeleton 88 are generated from the same IDL object model specification 74. This means that the client 80 knows exactly which operations it may invoke, what the input parameters are, and where they have to go in the invocation. Accordingly, when the invocation 92 reaches the target object, all parameters are present. Additionally, the local client's 80 ORB 86 and the remote object's ORB 96 operate on a common protocol that provides a representation to specify the identity of the target object, its operation, and all parameters (input and output) of every type that they may use. Accordingly, although the local ORB 86 can tell from the object reference that the target object is a remote object, the client 80 does not know the physical operating location of the target object. There is nothing in the object reference token obtained by the client 80 that the client holds and uses at invocation time that identifies the location of the target object. The token is opaque to the client. This ensures location transparency in order to simplify the design of distributed object computing applications.

Another example of middleware development environments are COM (Common Object Model) and DCOM (Distributed COM) developed by Microsoft Corporation of Redmond, Wash., USA. COM refers to both a specification and implementation developed by Microsoft Corporation which provides a framework for integrating components. This framework supports interoperability and reusability of distributed objects by allowing developers to build systems by assembling reusable components from different vendors which communicate via COM in a manner similar to that of the CORBA example provided above. By applying conventional COM to build systems of preexisting components, developers attempt to reap benefits of maintainability and adaptability. COM defines an application programming interface (API) to allow for the creation of components for use in integrating custom applications or to allow diverse components to interact.

However, in order to interact, COM components must adhere to a binary structure specified by Microsoft Corporation. As long as COM components adhere to this binary structure, components written in different languages can interoperate using COM on the Windows platform only. Distributed COM is an extension to COM that allows network-based component interaction. While COM processes can run on the same machine but in different address spaces, the DCOM extension allows processes to be spread across a network. With DCOM, components operating on a variety of other platforms can interact, as long as DCOM is available on those other platforms.

Another technology related to middleware and the use of object-oriented programming is referred to as a bridge design pattern. A bridge design pattern bridges two object models, typically an abstraction and its implementation. The bridge design pattern is described more fully in a book entitled "Design Patterns—Elements of Reusable Object-Oriented Software" authored by Erich Gamma, Richard Helm, Ralph Johnson, and John Vlissides (ISBN 0-201-63361-2), published by Addison Wesley Publishing Company, 2000. The entire teachings and contents of this reference are hereby incorporated by reference in their entirety.

SUMMARY

Conventional mechanisms and techniques used for developing software applications that rely on middleware environments suffer from a variety of deficiencies. In particular, when a software developer produces an object model specification using an interface description language (IDL) and compiles this object model specification using a conventional middleware compiler such as a conventional CORBA IDL compiler, the conventional stubs 84 (FIG. 1) and skeletons 88 (FIG. 1) and any functionality exposed through the CORBA stubs or skeletons requires sophisticated knowledge of the IDL and its specific language mappings (to Java, C++, etc). Application programmers responsible for developing client 80 application code, who often lack this knowledge of middleware specific information, are often slowed down in their development efforts by the middleware-specific information produced within the generated IDL stubs 84 and IDL skeletons 88. Programmers can thus become significantly more productive if they program using CORBA-independent stubs and skeletons.

As a specific example, a CORBA interface typically consists of many IDL "types" including the interface itself, one or more super interfaces, enums, exceptions, sequences, structs, valuetypes, methods with parameters and return types, and so forth. When presented with an IDL interface object model specification 74, a conventional IDL-to-Java compiler emits the conventional IDL object model (stubs 84 and skeletons 88 in FIG. 1 above), which are realized by a plethora of Java classes and Java interfaces, each conforming to the IDL-to-Java mapping. While this object model is ORB-vendor independent, unfortunately, the conventionally emitted files are cluttered with middleware-specific (i.e., CORBA) information, such as CORBA markers, interface-repository information, references to the CORBA ORB and its methods, methods invoked by the CORBA ORB, marshalling functionality, and the like. Such middleware-specific information is often distracting and confusing to application development programmers unfamiliar with CORBA. As a result, the programmers who must utilize the stubs and skeletons must become familiar to some extent with middleware-specific information presented within the interface stubs 84 and skeletons 88. The programmers are thus less efficient. The programmers can become significantly more productive if they program using CORBA-independent stubs and skeletons, but conventional middleware development platforms do not provide such capability.

Additionally, in the event that an owner of software desires to change the middleware system, for example, from CORBA to a middleware system such as COM, the application software that relies on the middleware system must be revised so that the middleware-specific references utilized within the IDL stubs and skeletons comply with the new selected middleware environments. Accordingly, initial selection of a conventional middleware environment can become an important decision when creating software using conventional middleware development techniques due to the future difficulty of switching to a different middleware platform after the software has been developed using a chosen middleware platform. As new middleware platforms enter the marketplace and/or as existing platforms are equipped with more features (or client application requirements change), dependence upon a specific middleware platform can become problematic.

One solution to this problem is described in detail in patent application entitled "METHODS AND APPARATUS FOR CREATING MIDDLEWARE INDEPENDENT SOFTWARE" filed Mar. 31, 2005, having U.S. Ser. No. 11/095,406 (U.S. Pat. No. 7,546,309), sharing co-inventorship herewith, and assigned to the same assignee as the present invention. Another solution to this problem for valuetypes is described in detail in patent application entitled "METHODS AND APPARATUS PROVIDING A CATEGORICAL APPROACH TO VALUETYPE BRIDGE SUPPORT" filed Jan. 3, 2006, having U.S. Ser. No. 11/324,843 (U.S. Pat. No. 7,596,572), sharing co-inventorship herewith, and assigned to the same assignee as the present invention. The entire teachings and contents of these referenced patent applications are hereby incorporated by reference in their entirety. The solution described in the above-referenced patent applications apply for many different IDL types, such as interface, enum, struct, exception, valuetypes, and sequence used within object oriented programming languages such as Java.

Technology related to producing or generating code using a categorical approach is described in patent application entitled "SYSTEM AND METHODS FOR GENERATING A SOFTWARE COMPONENT INTERFACE" filed Jun. 24, 2005, having U.S. Ser. No. 11/166,934 (U.S. Pat. No. 7,673,285), sharing co-inventorship herewith, and assigned to the same assignee as the present invention. The entire teachings and contents of this referenced patent application are hereby incorporated by reference in their entirety.

Other problems also arise when trying to insulate application developers from details of middleware-specific issues. In particular, a central tenet of conventional large-scale software design is the separation of functional from non-functional concerns. While functional requirements are typically addressed by application programmers who are intimately familiar with the domain, non-functional requirements are resolved by infrastructure programmers who concentrate on the software development framework, componentization, middleware, process and thread manipulation, etc. Many non-functional programming concerns can be adequately addressed by conventional standard, object-oriented programming methodologies. However, other concerns cut across the natural unit of object-oriented modularity, the class. Examples of such concerns are weaving (i.e., coding or otherwise implementing) functionality into certain locations in the program under well-specified circumstances and, more strikingly, modifying the program's core structure.

To address such crosscutting concerns, a conventional programming methodology known as aspect-oriented programming (AOP) has been devised in the software development industry. Both Java and C++ have been extended to support conventional AOP with products such as AspectJ and AspectC++, respectively, although neither product has gained broad acceptance.

There are associated problems with conventional AOP techniques. These conventional AOP products incur a heavy overhead requiring programmers to learn new programming languages, employ new development environments, enhance the existing build systems, and so forth. Instead of incurring this heavy overhead, embodiments disclosed herein reap the benefits of AOP, but by programmatically weaving code into bridges. Bridge technology used in accordance with embodiments disclosed herein is described in detail in the aforementioned co-pending patent applications.

A novel approach disclosed herein is referred to as generative, aspect-oriented programming (GAOP). Embodiments include a software development system that significantly overcomes the aforementioned deficiencies and provides a system, mechanisms and techniques that, given, as input a non-functional requirement, provide as output a generative, aspect-oriented programming (GOAP) solution to that requirement. As an example, given an object model, specified in for example an Interface Description Language (IDL), the system disclosed herein generates an abstraction of that object model that preserves the application semantics expressed in the IDL, but that is middleware (e.g. CORBA) independent and accounts for such things as providing authentication context between components, providing timeout information for remote invocations, and providing mechanisms for obtaining specific target identities of invoked components (rather than emittingmiddleware specific information that is cryptic). In addition, the system explained herein generates an implementation of that abstraction for a particular middleware such as CORBA or another selected middleware platform.

Examples of GOAP as disclosed herein provide a system, apparatus and methods for propagating context between components in a component server. In particular, mechanisms and techniques include generating code capable of implicitly propagating authenticating context between a client component and an invoked component which the client component invokes in a component server. The authenticating context allows the invoked component to authenticate the client component, without requiring significant knowledge of middleware programming on behalf of developers. In so doing, a programmer is insulated form dealing with middleware specific issues related to authentication of client components to invoked components.

Additionally, the system explained herein provides mechanisms and techniques that include generating or producing a function that allows the specification of a timeout between the client component and the invoked component that the client component invokes in the component server. The timeout specifies a timeout to be applied to interface invocations between the client component and the invoked component. By providing timeout code that is generated and allowing a programmer to specify a timeout parameter, programmers need not be concerned with details of middleware specific issues related to timeouts for interface calls.

Further still, the system provides mechanisms and techniques that include generating code that includes a function declaration that, when invoked, discloses a target component identity between a client component and an invoked component that the client component invokes in the component server. The target component identity specifies a specific identity of a target computer system (e.g., IP address and other specific information, such as port identities) to which an interface invocation between the client component and the invoked component is directed. By providing a function that returns simple identity information such as IP address information of the computer executing the target component, this target component identity information can be useful for debugging purposes and avoids developers having to rely on cryptic middleware messages that require an intimate knowledge of middleware (e.g. CORBA) specific component identity information. Generally then, using these mechanisms, the system defines mechanisms to receive input in the form of a non-functional requirement and produces, as output, a generative, aspect-oriented solution to that requirement.

Using CORBA as an example middleware platform, generation of the abstraction interface object model (i.e., an abstracted interface object model) that includes the above features conceals all the CORBA-related information, while preserving application functionality, while generation of the implementation of the abstraction interface object model produces a CORBA or other middleware implementation object model that implements the interfaces and abstract classes in the interface object model using CORBA, but that is hidden from the programmer developing an application. In this manner, a software developer can obtain the benefits of middleware such as CORBA without having to have knowledge of CORBA and without having interface calls cluttered with CORBA specific information.

Other embodiments include computerized devices, such computer systems, workstations or other devices configured or operable to process and perform all of the method and processing operations disclosed herein as embodiments of the invention. In such embodiments, a computer system includes a memory system, a processor, a communications interface and optionally a display and an interconnection mechanism such as a bus, circuitry or a motherboard connecting these components. The memory system is encoded with a generator application (i.e. a categorical-based generator) that when performed on the processor, produces a generator process that operates as explained herein to perform all of the method embodiments and operations explained herein.

Other arrangements of embodiments of the invention that are disclosed herein include software programs to perform the method embodiment steps and operations summarized above and disclosed in detail below of the categorical-based generator. More particularly, a computer program product is disclosed that has a computer-readable medium including categorical-based generator computer program logic encoded thereon that when performed in a computerized device provides operations of the categorical-based generator application and categorical-based generator process as respectively explained herein. The computer program logic, when executed on at least one processor with a computing system, causes the processor to perform the operations (e.g., the methods) indicated herein as provided by the categorical-based generator. In addition, the abstracted and implementation object models explained herein when encoded on a computer readable medium represent embodiments of the invention as well. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software (source code and/or object code) or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other software development entities are also categorical-based generators when configured as explained herein. The system of the invention can be distributed between many software processes on several computers, or processes such as the categorical-based generator process can execute on a dedicated computer alone. The categorical-based generator (also generally referred to herein as simply the generator) may be integrated into a storage area network management application as well, or used in development of any type of distributed software.

It is to be understood that the system of the invention can be embodied strictly as a software program, as software and hardware, or as hardware alone. Example embodiments of the invention may be implemented within EMC Corporation's software application(s) that provide management functionality for storage area network resources and in computerized devices that operate, for example, ControlCenter software. ControlCenter is a trademark owned by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
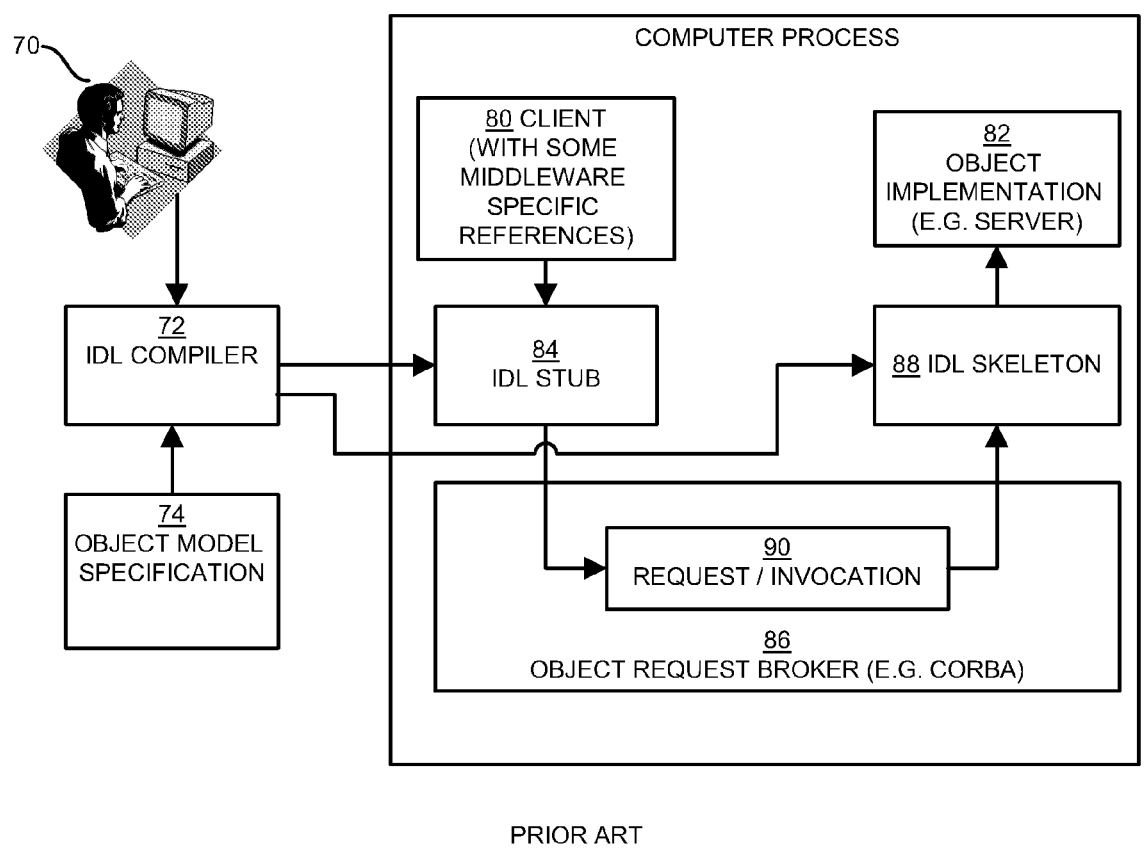
FIGS. 1 and 2 are prior art illustrations of operations of conventional middleware.
Figure 2:
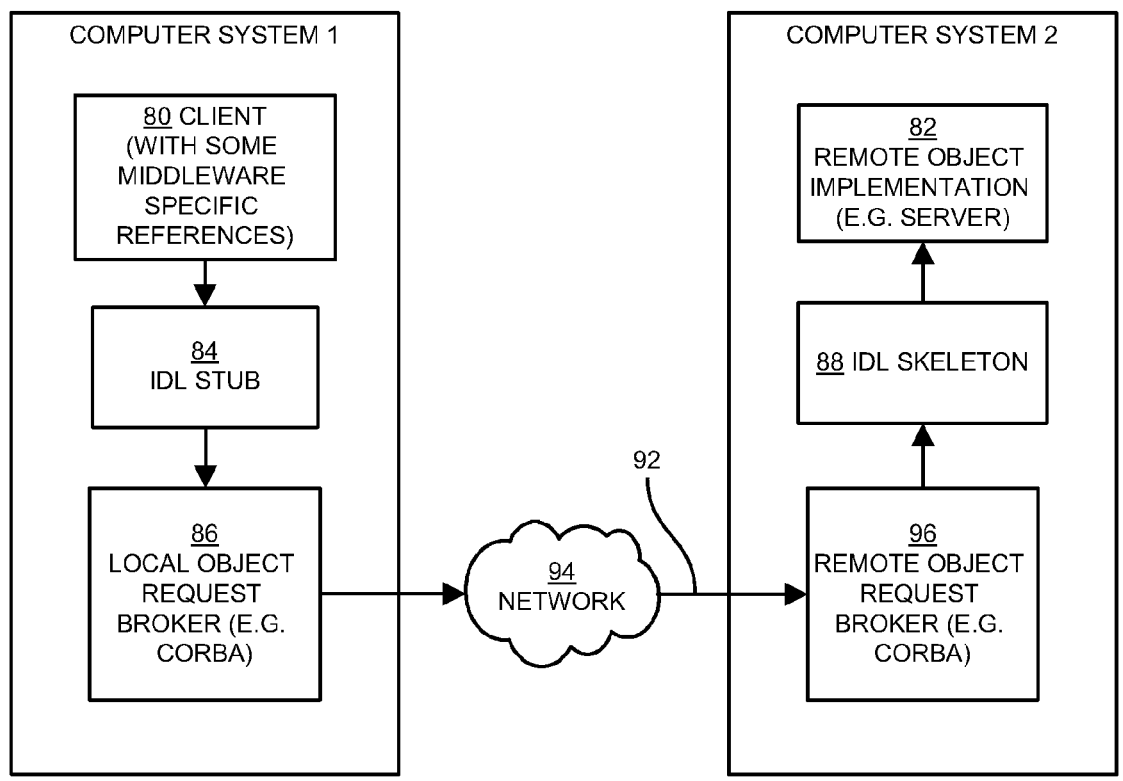

Embodiments of the invention provide a system that defines mechanisms to receive input in the form of a non-functional requirement and produces, as output, a generative, aspect-oriented solution to that requirement. In particular, the system is able to receive an object model, specified for example in an Interface Description Language (IDL), and is able to generate an abstraction of that object model that preserves the application semantics expressed in the IDL, but that is middleware independent. In addition, the system explained herein generates an implementation of that abstraction for a particular middleware such as CORBA or another selected middleware platform. The system disclosed herein is able to implicitly propagate authenticating context between a client component and an invoked component which the client component invokes in a component server. In so doing, a programmer is insulated form dealing with middleware specific issues related to authentication of client components to invoked components. The system is further able to produce a function that allows the specification of a timeout between the client component and the invoked component that the client component invokes in the component server. The timeout specifies a timeout to be applied to interface invocations between the client component and the invoked component.

Further still, techniques explained herein provide mechanisms and techniques that include generating or producing a function declaration that, when invoked, discloses a target component identity between a client component and an invoked component that the client component invokes in the component server. The target component identity specifies a specific identity of a target computer system to which an interface invocation between the client component and the invoked component is directed. Using these mechanisms, the system defines mechanisms to receive input in the form of a non-functional requirement and produces, as output, a generative, aspect-oriented solution to that requirement.

Using CORBA as an example, one purpose of the abstracted interface object model is to conceal all the CORBA (i.e., middleware) related information, while preserving application functionality. One purpose of the CORBA-implementation object model is to implement the interfaces and abstract classes in the interface object model using CORBA. To do so, the system disclosed herein provides a categorical-based generator (also referred to herein as a generator). Through application of morphisms to the object model specification, the system conceals all middleware-related information, while preserving application functionality of an application that uses the object model specification and operates with input in the form of a non-functional requirement and generates, as output, a generative, aspect-oriented solution to that requirement. Example solutions using GAOP described herein include passing of context information related to authentication of components, generating a timeout function that uses a user specified parameter indicating timeout information for component invocations, and simplifying component target computer identification.

Example discussions of embodiments disclosed herein use CORBA as a middleware platform for ease of discussion of processing. However, it is to be understood that the system disclosed herein is not limited to CORBA and that other implementation object models could also be emitted, based on various middleware technologies such as RMI, Tibco, or COM. Furthermore, a no-middleware object model could be emitted for a configuration that uses collocation.

It is also to be understood that the invention is not limited to receiving an object model specification in IDL. IDL is used in the examples herein since it is language and platform neutral. In other words, IDL was chosen because it is platform- and language-neutral, not due to its CORBA origins.

Figure 3:
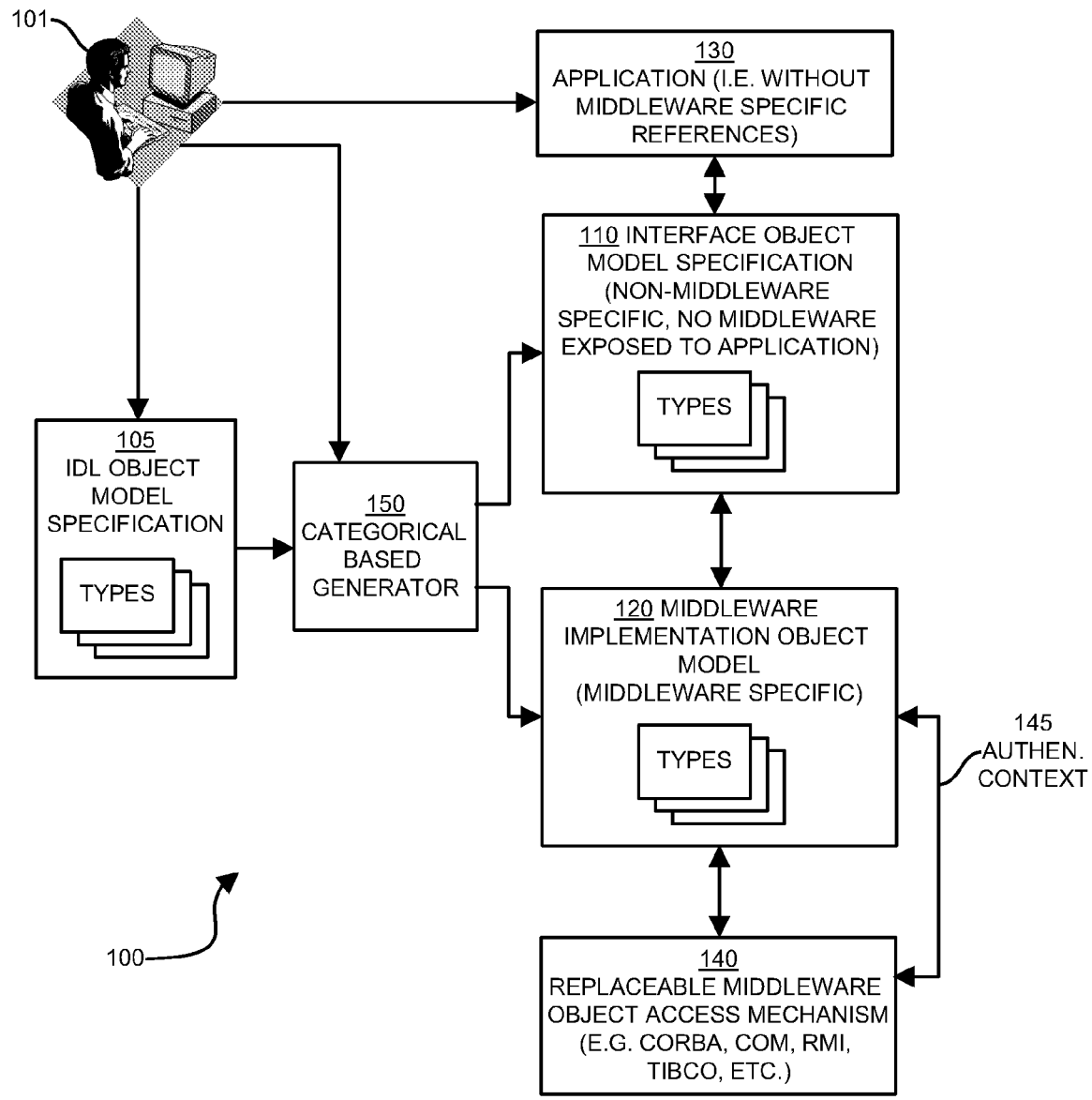
FIG. 3 illustrates an example software generation environment that operates according to embodiments disclosed herein.

FIG. 3 illustrates an application development environment 100 suitable for use in explaining example embodiments of the system disclosed herein. The system disclosed herein allows a developer 101 to provide an IDL object model 105 as input to a categorical-based generator 150 configured in accordance with embodiments of the invention. A categorical-based generator 150 examines each type defined in the IDL object model 105 and produces, as output, an abstraction interface object model 110 that is an abstraction of the IDL object model specification 105 that can be utilized by the developer 101 when creating the application 130, but that hides any middleware related information. Additionally, the categorical-based generator 150 (hereinafter the generator 150) produces an implementation 120 of the abstraction interface object model for a particular middleware object access mechanism 140 used to access data within objects corresponding to the object model specification 105. These generated items are enabled to propagate context 145 such as, for example, authentication context, so that programmers of the application 130 do not need to be intimately familiar with middleware specific issues related to passage of such context as explained herein. Since the system disclosed herein describes application of this process as it relates to insulating a developer from authentication between components, handling timeout issues of invocations between components, and handling issues of target component identification, the remaining discussion will relate to these example areas of processing.

Figure 4:
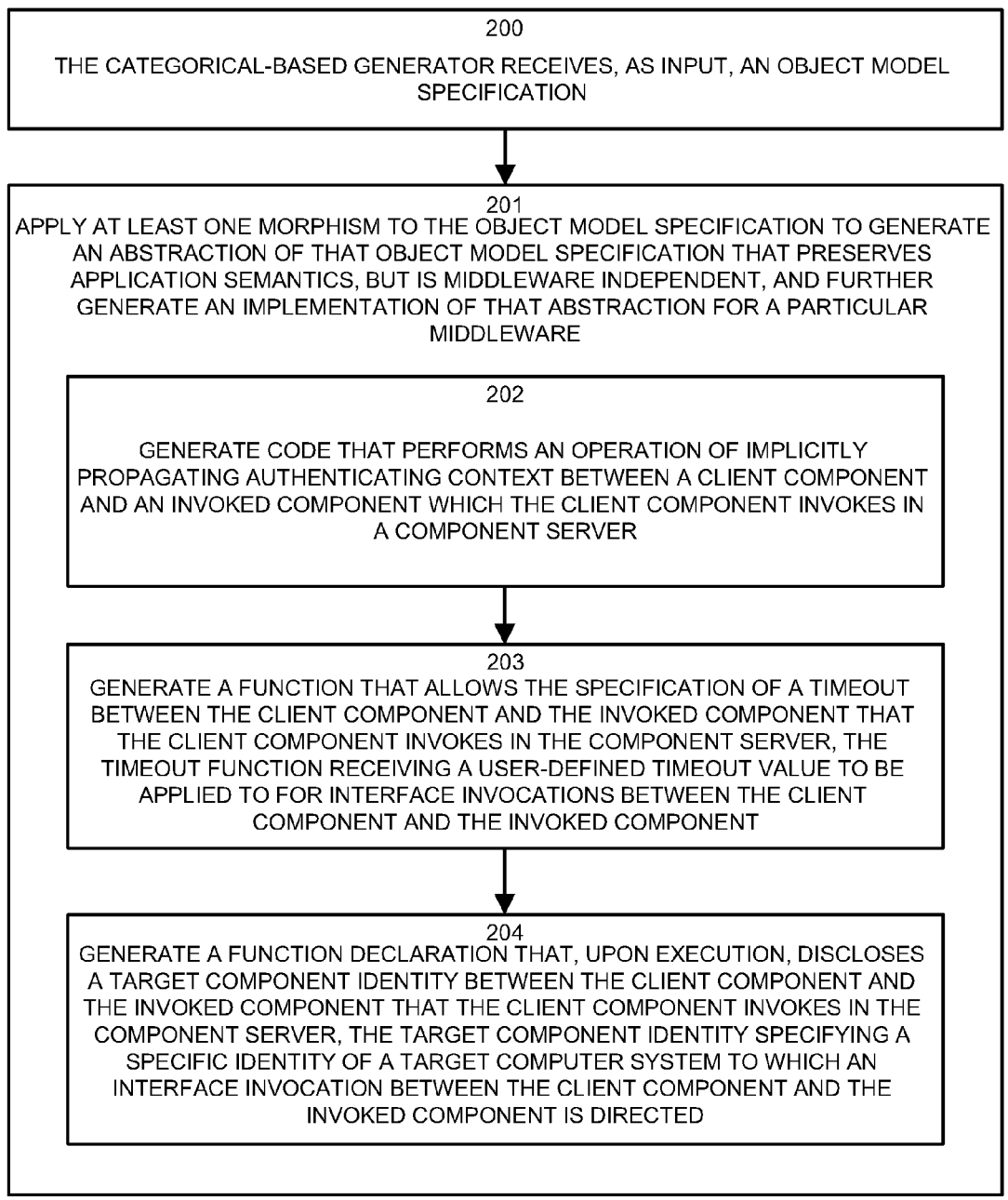
FIG. 4 is a flow chart of processing steps performed by a categorical-based generator as disclosed herein.

FIG. 4 is a flow chart of processing steps performed by a categorical-based generator 150 (i.e. a generator according to embodiments disclosed herein) that produces a system capable of propagating context between components in a component server.

In step 200, the categorical-based generator 150 receives, as input, an object model specification 105.

In step 201, the categorical-based generator 150 applies at least one morphism (shown in examples below) to the object model specification 105 to generate an abstraction of that object model specification 105 that preserves application semantics, but is middleware independent, and further generates an implementation of that abstraction for a particular middleware.

Sub-steps 202 through 204 show three example configurations in which the generator 150 produces a system that propagates context between components in a component server for authentication, generates a function timeout information, and provides mechanisms for target computer identification.

Specifically, in step 202, the generator produces output (e.g., code) that implicitly propagates authenticating context 145 between a client component and an invoked component that the client component invokes in a component server. The authenticating context 145 allows authentication to take place between the client component and the invoked component without requiring any programmer involvement.

In step 203, the generator 150 produces a timeout function that allows the specification of a timeout between the client component and the invoked component that the client component invokes in the component server. The timeout function uses (i.e., receives or otherwise obtains) a timeout based on a user specified timeout parameter to be applied to interface invocations between the client component and the invoked component. The timeout function that allows specification of a timeout does not need to be specified by the client component developer, but rather is handled during code generation, thus insulating the programmer from having to deal with timeout issues other than setting a timeout parameter for expiration. In one configuration, the programmer explicitly sets the timeout parameter and the bridges enforce that parameter by manipulating the middleware (e.g., CORBA).

In step 204, the generator 150 produces a function declaration that, when invoked, discloses a target component identity between a client component and an invoked component that the client component invokes in the component server. The target component identity specifies a specific identity of a target computer system to which an interface invocation between the client component and the invoked component is directed.

Steps 202 through 204 are examples of the generator 150 providing a generative, aspect-oriented solution to a non-functional requirement. By "implicitly", what is meant is that the system generates code that handles details of authentication, timeout or target identity between components using middleware specific techniques that insulate the programmer from having to be intimately familiar with such middleware-specific techniques. In this manner, the system disclosed herein is able provide code for interactions between components in a component server much more seamlessly than conventional techniques support (i.e., without requiring significant client programmer involvement). Further details of this processing will now be demonstrated with respect to code examples that illustrate further configurations and enabling aspects of the invention.

Authentication Example

According to one example embodiment disclosed herein, the system enables the passing of authentication context during interface invocations, allowing the system disclosed herein to be able to implicitly authenticate access through all components in the component server. Authentication is the quintessential non-functional concern; all large software systems require authenticating users during login at the very least. In a component server, each component may independently require its users to authenticate themselves before providing services. Components do not operate in isolation; instead, some components rely on services provided by other components. Such a client component must somehow propagate the authenticating context to the components it invokes. Obviously, such propagation could be accomplished by requiring application programmers to program explicitly the context propagation within the component's coClass; however, such manual programming is distractive, error prone, and exposes the underlying middleware. The following example describes how GAOP addresses this non-functional concern.

Authenticating context may be implicitly propagated among components in the component server in various ways. One possibility is adding an extra parameter to each method invocation in the component's IDL. Unbeknown to the client component, the bridges then implicitly weave a context prior to the remote invocation through that extra parameter. The context can include the userid and the token used for authentication. Upon receipt in the invoked component's coBridge, the userid and token are read from the context and dispatched for authentication before the invocation is delegated to the invoked component's coClass, with the extra context-carrying parameter removed. Notice that at the coClass level neither the client component nor the invoked component are aware that authentication took place. This is an example of generative code weaving in GAOP.

One advantage of this design is its middleware independence. This design however may require minor modifications to the components' IDL definitions, which although generated, may surprise component developers. This solution may also complicate the build system.

The strategy chosen in the current implementation of the example configuration does not require modifying the component's IDL definitions; however, it does require middleware support for invocation context. Fortunately, CORBA features a sophisticated portable interceptor mechanism employed in this solution. In particular, this CORBA feature is referred to as Portable Interceptors (PI) and is described in the Common Object Request Broker Architecture (CORBA) v2.6 Specification, in Portable Interceptors, Chapter 21, published December 2001. The entire contents of this reference is hereby incorporated by reference in its entirety. Other middleware technologies, however, do not support interceptors natively, such as Java RMI. While Java dynamic proxies can simulate interceptors, interoperability with C++ is complex.

In one example operation, before issuing a remote call, a remote client sets the userid and token in its thread PICurrent. That thread PICurrent is logically copied into the context PICurrent, and is then dispatched to another component in the component server. An interception point in the component server authenticates the call, and upon success upcalls to the servant and from there to the coBridge and then to the coClass. If authentication fails, the upcall to the servant is not issued, and the remote client is properly notified. The problem with this mechanism is context propagation, where the invoked component becomes the client for yet another remote invocation. Regrettably, CORBA does not directly provide such a mechanism. As mentioned earlier, forcing component developers to propagate the context programmatically is unacceptable. Instead, as disclosed herein, generative code weaving in the coBridge solves the context propagation problem. As previously incorporated by reference, Common Object Request Broker Architecture (CORBA) v2.6 Specification recites: "The PortableInterceptor::Current object (hereafter referred to as PICurrent) is a Current object that is used specifically by portable Interceptors to transfer thread context information to a request context."

Specifically, as shown below, the morphisms provided by the generator 150 from the IDL object model to the CORBA-implementation object model weaves an invocation of the static method fwd_svc_cxt( ) of ServerLogin into the coBridge before each upcall to the coClass. This is shown in the example code below:

```
package com.emc.eccapi.bridge.TestComponentBook;
/*
 * Generated coBridge for component
 *                com.emc.eccapi.TestComponent-
    Book.TestComponentBook.
 */
public abstract class TestComponentBookCoBridge
    extends
com.emc.eccapi.TestComponent-
    Book.TestComponentBookCoClass
{
    ...
    public java.lang.String book_BookDiscovery_ge-
        tReaderName( )
    {
    com.emc.eccapi.server.ServerLogin.fwd_svc_cxt( )
    return      super.book_BookDiscovery_getReader
        Name( );
    }
    ...
}
```

Example 1

Context Propagation Using GAOP

The definition of the method fwd_svc_cxt( ) of ServerLogin is given in the code example 2 below:

```
package com.emc.eccapi.server;
...
public class ServerLogin
{
    final private int user_cred_slot_id;
    final private int login_token_slot_id;
    final private Current pi_current;
    private static ServerLogin INSTANCE;
    ...
    public static void fwd_svc_cxt( )
    {
        try
        {
            if (null == INSTANCE)
                throw new FatalError(ERROR_MSG);
            // Propagate user.
```

-continued

```
        Any user = INSTANCE.pi_current.get_slot(
                INSTANCE.user_cred_slot_id
                            );
        INSTANCE.pi_current.set_slot(
                INSTANCE.user_cred_slot_id, user
                            );
        // Propagate token.
        Any token = INSTANCE.pi_current.get_slot(
                INSTANCE.login_token_slot_id
                            );
        INSTANCE.pi_current.set_slot(
                INSTANCE.login_token_slot_id, token
                            );
    }
    catch (InvalidSlot e)
    {
        throw new FatalError(
                "Uninstalled ServerCredentialsInterceptor."
                ,e
                            );
    }
    catch (Throwable e)
    {
        throw new FatalError("Unexpected exception.", e);
    }
  }
  ...
}
```

Example 2

Forwarding Context

This method above first retrieves the user from a predetermined slot in PICurrent, and then, in preparation for the remote invocation, sets that same slot in PICurrent with the obtained value. The login token is handled similarly. In this manner, the system disclosed herein implicitly propagates authenticating context between a client component and an invoked component which the client component invokes in a component server. The system provides at least one authentication context parameter to each method invocation defined in an interface description of the invoked component and operates a coBridge associated with the invoked component to implicitly weave the authenticating context between the client component and the component that the client component invokes.

Timeout Example

According to another example embodiment disclosed herein, the system enables generation of code to handle the setting of timeouts for interface invocations.

At the functional level, remote invocations are specified to accomplish some domain activities. In code, a remote invocation may be submitted in several manners: synchronously, synchronously but constrained by a timeout, asynchronously, etc. Since asynchronous programming is rather involved, this invocation style is currently not supported by the infrastructure. Specifying the invocation timeout is a non-functional concern, which should be ignored while modeling the application, and in particular should not pollute the declaration of the component's remotable interfaces, that are expressed in IDL. In accordance with configurations disclosed herein, armed with GAOP, for every remotable interface, the morphism from the IDL object model to the interface object model weaves the following method declaration into the corresponding bridge object:

```
package com.emc.eccapi.bridge.book;
/*
 * Generated interface for the IDL interface
 * com.emc.eccapi.book.BookDiscovery.
 */
public interface IBookDiscovery
    extends com.emc.eccapi.bridge.framework.ILookup
{
    ...
    void setRelativeRoundtripTimeout(long timeoutMs);
    ...
}
```

Example 3

Declaring a Roundtrip-Timeout Setter with GAOP

Similarly, for every remotable interface, the morphism from the IDL object model to the CORBA-implementation object model weaves the following method definition into the corresponding bridge object:

```
package com.emc.eccapi.bridge.book;
/*
 * Generated implementation for the IDL interface
 * com.emc.eccapi.book.BookDiscovery.
 */
public class BookDiscoveryImpl_
    implements    com.emc.eccapi.bridge.book.IBook-
        Discovery   ,com.emc.eccapi.bridge.framework.I-
        Lookup
{
    ...
    public void setRelativeRoundtripTimeout(long timeoutMs)
    {
        com.emc.eccapi.server.ComponentServer.
        setRelativeRoundtripTimeout(this.delegate, timeoutMs);
    }
    ...
}
```

Example 4

Defining a Roundtrip-Timeout Setter with GAOP

The implementation of setRelativeRoundtripTimeout( ) simply delegates to the static method setRelativeRoundtripTimeout( ) in the ComponentServer, which hinges on a CORBA timeout policy, as shown in the example below:

```
package com.emc.eccapi.server;
public class ComponentServer implements java.lang.Runnable
{
    ...
    public static void
    setRelativeRoundtripTimeout(org.omg.CORBA.Object target
                        ,long timeout_ms
                        )
    {
        org.omg.CORBA.Policy p =    new
    org.jacorb.orb.policies.
```

-continued

```
        RelativeRoundtripTimeoutPolicy(timeout_ms);
    target._set_policy_override(new Policy[ ]{ p }
                        ,SetOverrideType.SET_OVERRIDE
                    );
    }
    ...
}
```

Example 5

Setting the Invocation Timeout

From the above described example configurations, empowered by GAOP, a non-functional concern was generatively weaved into the component framework.

Target Identity Example

According to yet another example embodiment disclosed herein, the system enables the identification of target identity information during invocations of interfaces between clients and invoked components to allow or produce a revealing of the identity of an interface at the level of a computer system, port or socket upon which the call is made. In particular, the system produces a function declaration that, when invoked, discloses a target component identity between a client component and an invoked component that the client component invokes in the component server.

A key benefit of a well-written communication middleware is the abstraction of communication endpoints, such as network sockets. CORBA excels in that respect by introducing the Interoperable Object Reference (IOR), which is an opaque handle for an interface. The interface IUnknown in Microsoft's Component Object Model (COM) servers a similar purpose. As a rule, application code should avoid the reification of the interface abstraction into a raw IP address and port number in IP-based communication middleware.

However, reifying the interface is occasionally necessary, primarily in the context of error reporting. Consider for example an interface that refuses a communication attempt. Reporting that interface's IOR will provide a rather cryptic error message if a dump IOR utility is not available. Reporting that interface's IP address as provided by the system disclosed herein, however, allows the specific identification and therefore inspection of the server where the offending interface resides.

Armed with GAOP, for every remotable interface, the morphism from the IDL object model to the interface object model weaves the following method declaration into the corresponding bridge object:

package com.emc.eccapi.bridge.book;
/*
* Generated interface for the IDL interface
* com.emc.eccapi.book.BookDiscovery.
*/
public interface IBookDiscovery
    extends com.emc.eccapi.bridge.framework.ILookup
{
    ...
    String getTargetIdentity( );
    ...
}

Example 6

Declaring a Target Identity Discoverer with GAOP

In the above example configuration, the _getTargetIdentity( ) method identifies the interface by providing information about each of its endpoints, consisting of an IP address, port number, and SSL port number. Similarly, for every remotable interface, the morphism from the IDL object model to the CORBA-implementation object model weaves the following method definition into the corresponding bridge object:

package com.emc.eccapi.bridge.book;
/*
* Generated implementation for the IDL interface
* com.emc.eccapi.book.BookDiscovery.
*/
public class BookDiscoveryImpl_
    implements      com.emc.eccapi.bridge.book.IBook-
        Discovery     ,com.emc.eccapi.bridge.framework.I-
        Lookup
{
    ...
    public String getTargetIdentity( )
    {
        return    com.emc.eccapi.server.ComponentServer.
            getTargetIdentity(this.delegate);
    }
    ...
}

Example 7

Defining an identity discoverer with GAOP

In the above example configuration, the implementation of _getTargetIdentity( ) simply delegates to the static method getTargetIdentity( ) in the ComponentServer, which hinges on JacORB-specific inspection of CORBA references. In this manner, a developer, via a call to the target identity function, is able to identify the target computer to which the remote invocation was directed form the client without requiring knowledge of cryptic target component identities provided by the middleware system. By reducing this to a specific IP address and port information related to the target system, this example configuration simplifies development.

The aforementioned example embodiments thus provide mechanisms to avoid a programmer from requiring intimate knowledge of middleware specific data or programming styles or techniques, thus making software development that uses middleware more efficient.

Is to be understood that embodiments described herein include the generator 150 as a software application, or as part of another application, or as logic instructions and/or data encoded within a fixed or removable computer readable medium such as a floppy disk, hard disk or in an optical medium, or in a memory system such as in firmware, read only memory (ROM), or, as in the previous examples, as executable code within a memory system (e.g., within random access memory or RAM). It is also to be understood that other embodiments provide the generator 150 operating within a processor such as a central processing unit as a process. While not shown in this example, those skilled in the art will understand that a computer system can implement the generator and may include other processes and/or software and hardware components, such as an operating system, compiler, etc. Thus embodiments of the invention include the generator program existing as either code in unexecuted form on a computer readable medium (e.g., as a software program on a transportable medium such as a CDROM) or as an executing software process or as a computer system configured to operate as explained herein.

Other alternative arrangements of the invention include rearranging the processing steps explained above in such a way that the overall effect of the invention is the same or an equivalent. It is to be thus understood by those skilled in the art that the particular arrangement of processing steps in many instances does not specify implementation of embodiments. As such, those skilled in the art of software development and computer-related technologies will understand that there can be many ways and orders of representing the processing operations explained above and such alternative embodiments of the software code will still achieve the overall effects, features and advantages of the invention as explained herein. In addition, embodiments of the invention are not limited to operation on the computer systems shown above. The generator can operate on shared computing resources, or can be distributed among any number of computer systems. Furthermore, embodiments of the invention may operate to map application code to middleware for use in a storage area network management application. Thus a storage area network management application configured with authentication, timeout and target identity processing as explained herein is also considered an embodiment of the invention.

What is claimed is:

1. A computer-implemented method for generating code, the computer-implemented method comprising:
   generating an abstraction of an interface object model, the interface object model being specified in an Interface Description Language of a given middleware platform, the abstraction preserving application semantics expressed in the Interface Description Language, the abstraction being independent of the given middleware platform, the abstraction concealing middleware related information while preserving application functionality;
   receiving input at a software development system, the input being a non-functional requirement, the software development system configured to generate code based on aspect-oriented programming;
   generating code, via the abstraction, that performs an operation of implicitly propagating authenticating context between a client component and an invoked component which the client component invokes in a component server, the authenticating context enabling the invoked component to authenticate the client component;
   generating a function, via the abstraction, that allows specifying a timeout between the client component and the invoked component that the client component invokes in the component server, the timeout function receiving a user-defined timeout value to be applied to for interface invocations between the client component and the invoked component;
   generating code, via the abstraction, that includes a function declaration that, upon execution, discloses a target component identity between the client component and the invoked component that the client component invokes in the component server, the target component identity specifying a specific identity of a target computer system to which an interface invocation between the client component and the invoked component is directed, the target component identity being disclosed in lieu of emitting middleware specific information; and
   generating an implementation of the abstraction for the given middleware platform, the implementation of the abstraction being enabled to generate code and generate functions in a software development environment.

2. The computer-implemented method of claim 1 wherein implicitly propagating authenticating context comprises:
   providing at least one authentication context parameter to each method invocation defined in an interface description of the invoked component; and
   operating a coBridge associated with the invoked component to implicitly weave the authenticating context between the client component and the invoked component which the client component invokes.

3. The computer-implemented method of claim 2 wherein providing at least one authentication context parameter comprises:
   providing the at least one authentication context parameter including a user identification and a token used for authentication; and
   wherein operating a coBridge associated with the invoked component to implicitly weave the authenticating context comprises:
   reading user identification and the token used for authentication from the authenticating context;
   dispatching the user identification and the token used for authentication before invocation of the invoked component is delegated to a coClass of the invoked component; and
   at least one authentication context parameter delegating the invocation of the invoked component to a coClass of the invoked component with the at least one authentication context parameter removed, such that neither the client component nor the invoked component are aware that authentication between the invoked component and the client component took place.

4. The computer-implemented method of claim 1 wherein implicitly propagating authenticating context comprises:
   before issuing a remote call to the invoked component, operating the client component to set at least one authentication context parameter including a user identification and a token used for authentication within a thread PICurrent;
   logically copying the thread PICurrent into a context PICurrent upon issuance of the remote call;
   dispatching a portable interceptor context to an authentication component in the component server; and
   operating an interception point in the component server to authenticate the remote call.

5. The computer-implemented method of claim 4 wherein operating an interception point in the component server to authenticate the remote call comprises:
   upon success of authentication, performing an upcall between a servant, a coBridge, and a coClass of the invoked component to allow invocation of the invoked component as a result of successful authentication of the client component; and
   upon failure of authentication, notifying the client component that attempted invocation of the invoked component has failed due to non-authentication.

6. The computer-implemented method of claim 4 comprising:
   operating a morphism from an interface description object model to a middleware-implementation object model to weave an invocation of a static forwarding authentication context method for a ServerLogin class into the coBridge before each upcall to the coClass;

retrieving a user value and token value from predetermined slots in thread PICurrent; and in preparation for the remote invocation, setting a slot in the thread PICurrent with the obtained user and token value.

7. The computer-implemented method of claim 1 wherein generating a function that allows specifying a timeout comprises:

for each remotable interface, operating a first morphism from an IDL object model to an interface object model to weave a round trip timeout method declaration into a corresponding bridge object; and for each remotable interface, operating a second morphism from the IDL object model to a middleware-implementation object model to weave a round trip timeout method definition into the corresponding bridge object.

8. The computer-implemented method of claim 7 comprises:

providing an implementation of the round trip timeout method that delegates to a static round trip timeout method in the component server which operates according to a middleware timeout policy.

9. The computer-implemented method of claim 1 wherein generating a function declaration that, upon execution, discloses a target component identity comprises:

for each remotable interface, operating a morphism from an IDL object model to an interface object model to weave a target identity method declaration into a corresponding bridge object; and for each remotable interface, operating the morphism from the IDL object model to a middleware-implementation object model to weave a target identity method definition into the corresponding bridge object.

10. The computer-implemented method of claim 9 comprising:

generating the target identity method declaration operable, upon execution, to identify an interface associated with the invoked component by providing information about interface endpoints including an IP address, port number, and SSL port number; and operating the target identity method declaration to delegate to a static target identity method in the component server, which operates using a Java-based object request broker-specific inspection of middleware references.

11. The computer-implemented method of claim 1, wherein implicitly propagating authenticating context comprises:

providing at least one authentication context parameter to each method invocation defined in an interface description of the invoked component; and operating a coBridge associated with the invoked component to implicitly weave the authenticating context between the client component and the invoked component which the client component invokes;

wherein providing at least one authentication context parameter comprises:

providing the at least one authentication context parameter including a user identification and a token used for authentication; and wherein operating a coBridge associated with the invoked component to implicitly weave the authenticating context comprises:

reading user identification and the token used for authentication from the authenticating context;

dispatching the user identification and the token used for authentication before invocation of the invoked component is delegated to a coClass of the invoked component; and at least one authentication context parameter delegating the invocation of the invoked component to a coClass of the invoked component with the at least one authentication context parameter removed, such that neither the client component nor the invoked component are aware that authentication between the invoked component and the client component took place.

12. The computer-implemented method of claim 2, wherein implicitly propagating authenticating context comprises:

before issuing a remote call to the invoked component, operating the client component to set at least one authentication context parameter including a user identification and a token used for authentication within a thread PICurrent;

logically copying the thread PICurrent into a context PICurrent upon issuance of the remote call;

dispatching a portable interceptor context to an authentication component in the component server; and operating an interception point in the component server to authenticate the remote call;

wherein generating a function that allows specifying a timeout comprises:

for each remotable interface, operating a first morphism from an IDL object model to an interface object model to weave a round trip timeout method declaration into a corresponding bridge object; and for each remotable interface, operating a second morphism from the IDL object model to a middleware-implementation object model to weave a round trip timeout method definition into the corresponding bridge object.

13. The computer-implemented method of claim 12, wherein generating a function declaration that, upon execution, discloses a target component identity comprises:

for each remotable interface, operating a morphism from an IDL object model to an interface object model to weave a target identity method declaration into a corresponding bridge object; and for each remotable interface, operating the morphism from the IDL object model to a middleware-implementation object model to weave a target identity method definition into the corresponding bridge object;

wherein providing at least one authentication context parameter comprises:

providing the at least one authentication context parameter including a user identification and a token used for authentication; and wherein operating a coBridge associated with the invoked component to implicitly weave the authenticating context comprises:

reading user identification and the token used for authentication from the authenticating context;

dispatching the user identification and the token used for authentication before invocation of the invoked component is delegated to a coClass of the invoked component; and at least one authentication context parameter delegating the invocation of the invoked component to a coClass of the invoked component with the at least one authentication context parameter removed, such that neither the client component nor the invoked component are aware that authentication between the invoked component and the client component took place.

14. A computer system comprising:

a memory;

a processor, an interconnection mechanism coupling the memory and the processor;

wherein the memory is encoded with a generator that when executed on the processor causes the computer system to generate code, that when executed, causes the computer system to propagate context between components in a component server by performing operations of:

generating an abstraction of an interface object model, the interface object model being specified in an Interface Description Language of a given middleware platform, the abstraction preserving application semantics expressed in the Interface Description Language, the abstraction being independent of the given middleware platform, the abstraction concealing middleware related information while preserving application functionality;

receiving input at a software development system, the input being a non-functional requirement, the software development system configured to generate code based on aspect-oriented programming;

generating code, via the abstraction, that performs an operation of implicitly propagating authenticating context between a client component and an invoked component which the client component invokes in a component server, the authenticating context enabling the invoked component to authenticate the client component;

generating a function, via the abstraction, that allows specifying a timeout between the client component and the invoked component that the client component invokes in the component server, the timeout function receiving a user-defined timeout value to be applied to interface invocations between the client component and the invoked component;

generating code, via the abstraction, that includes a function declaration that, upon execution, discloses a target component identity between a client component and an invoked component that the client component invokes in the component server, the target component identity specifying a specific identity of a target computer system to which an interface invocation between the client component and the invoked component is directed, the target component identity being disclosed in lieu of emitting middleware specific information; and generating an implementation of the abstraction for the given middleware platform, the implementation of the abstraction being enabled to generate code and generate functions in a software development environment.

15. The computer system of claim 14 wherein when the generated code performs the operation of implicitly propagating authenticating context, the generated code performs the operations of:

providing at least one authentication context parameter to each method invocation defined in an interface description of the invoked component;

operating a coBridge associated with the invoked component to implicitly weave the authenticating context between the client component and the invoked component which the client component invokes;

wherein when the generated code performs the operation of providing at least one authentication context parameter, the generated code performs the operation of:

providing the at least one authentication context parameter including a user identification and a token used for authentication; and wherein when the generated code performs the operation of operating a coBridge associated with the invoked component to implicitly weave the authenticating context, the generated code performs the operations of:

reading user identification and the token used for authentication from the authenticating context;

dispatching the user identification and the token used for authentication before invocation of the invoked component is delegated to a coClass of the invoked component; and at least one authentication context parameter delegating the invocation of the invoked component to a coClass of the invoked component with the at least one authentication context parameter removed, such that neither the client component nor the invoked component are aware that authentication between the invoked component and the client component took place.

16. The computer system of claim 14 wherein when the generated code performs the operation of implicitly propagating authenticating context, the generated code performs the operations of:

before issuing a remote call to the invoked component, operating the client component to set at least one authentication context parameter including a user identification and a token used for authentication within a thread PICurrent;

logically copying the thread PICurrent into a context PICurrent to a portable interceptor context upon issuance of the remote call;

dispatching a portable interceptor context to an authentication component in the component server; and operating an interception point in the component server to authenticate the remote call;

wherein when the generated code performs the operation of operating an interception point in the component server to authenticate the remote call, the generated code performs the operation of:

upon success of authentication, performing an upcall between a servant, a coBridge, and a coClass of the invoked component to allow invocation of the invoked component as a result of successful authentication of the client component; and upon failure of authentication, notifying the client component that attempted invocation of the invoked component has failed due to non-authentication; and wherein when executed in the computer system, the generated code causes the computer system to perform the operation of:

operating a morphism from an interface description object model to a middleware-implementation object model to weave an invocation of a static forwarding authentication context method for a ServerLogin class into the coBridge before each upcall to the coClass;

retrieving a user value and token value from predetermined slots in thread PICurrent; and in preparation for the remote invocation, setting a slot in the thread PICurrent with the obtained user and token value.

17. The computer system of claim 14 wherein when the generated code performs the operation of generating a function that allows specifying a timeout, the generated code performs the operations of:

for each remotable interface, operating a first morphism from an IDL object model to an interface object model to weave a round trip timeout method declaration into a corresponding bridge object; and for each remotable interface, operating a second morphism from the IDL object model to a middleware-implementation object model to weave a round trip timeout method definition into the corresponding bridge object;

wherein the generated code causes the computer system to perform the operation of:

providing an implementation of the round trip timeout method that delegates to a static round trip timeout method in the component server which operates according to a middleware timeout policy.

18. The computer system of claim 11 wherein when the computer system performs the operation of generating a function declaration that, upon execution, discloses a target component identity, the computer system performs the operations of:

for each remotable interface, operating a morphism from an IDL object model to an interface object model to weave a target identity method declaration into a corresponding bridge object; and for each remotable interface, operating the morphism from the IDL object model to a middleware-implementation object model to weave a target identity method definition into the corresponding bridge object;

wherein the computer system performs the operations of:

generating the target identity method declaration operable, upon execution, to identify an interface associated with the invoked component by providing information about interface endpoints including an IP address, port number, and SSL port number; and operating the target identity method declaration to delegate to a static target identity method in the component server, which operates using a Java-based object request broker-specific inspection of middleware references.

19. A computer readable storage medium including computer program logic encoded thereon that, when executed on a computer system, provides a generator that causes the computer system to generate code, that when executed, causes the computer system to propagate context between components in a component server by performing operations of:

generating an abstraction of an interface object model, the interface object model being specified in an Interface Description Language of a given middleware platform, the abstraction preserving application semantics expressed in the Interface Description Language, the abstraction being independent of the given middleware platform, the abstraction concealing middleware related information while preserving application functionality;

receiving input at a software development system, the input being a non-functional requirement, the software development system configured to generate code based on aspect-oriented programming;

generating code, via the abstraction, that performs an operation of implicitly propagating authenticating context between a client component and an invoked component which the client component invokes in a component server, without programmer involvement, the authenticating context enabling the invoked component to authenticate the client component;

generating a function, via the abstraction, that allows specifying a timeout between the client component and the invoked component that the client component invokes in the component server, the timeout function receiving a user-defined timeout value to be applied to for interface invocations between the client component and the invoked component;

generating code, via the abstraction, that includes a function declaration that, upon execution, discloses a target component identity between a client component and an invoked component that the client component invokes in the component server, the target component identity specifying a specific identity of a target computer system to which an interface invocation between the client component and the invoked component is directed, the target component identity being disclosed in lieu of emitting middleware specific information; and generating an implementation of the abstraction for the given middleware platform, the implementation of the abstraction being enabled to generate code and generate functions in a software development environment.

* * * * *